United States Patent
Huang

(10) Patent No.: US 8,245,293 B2
(45) Date of Patent: Aug. 14, 2012

(54) METHODS AND APPARATUSES FOR SECURELY OPERATING SHARED HOST COMPUTERS WITH PORTABLE APPARATUSES

(76) Inventor: Evan S. Huang, Cupertino, CA (US)

( * ) Notice: Subject to any disclaimer, the term of this patent is extended or adjusted under 35 U.S.C. 154(b) by 1014 days.

(21) Appl. No.: 12/223,309

(22) PCT Filed: Mar. 30, 2007

(86) PCT No.: PCT/US2007/007971
§ 371 (c)(1),
(2), (4) Date: Jul. 28, 2008

(87) PCT Pub. No.: WO2007/123728
PCT Pub. Date: Nov. 1, 2007

(65) Prior Publication Data
US 2009/0031403 A1    Jan. 29, 2009

Related U.S. Application Data

(60) Provisional application No. 60/788,189, filed on Mar. 31, 2006.

(51) Int. Cl.
*G06F 21/00*    (2006.01)
(52) U.S. Cl. .............. 726/20; 726/16; 726/17; 726/18; 726/19; 709/220; 717/174; 717/175; 717/176
(58) Field of Classification Search ............... 726/4, 21
See application file for complete search history.

(56) References Cited

U.S. PATENT DOCUMENTS

| | | | |
|---|---|---|---|
| 5,509,120 A | 4/1996 | Merkin et al. | |
| 5,694,600 A | 12/1997 | Khenson et al. | |
| 6,016,402 A | 1/2000 | Thomas et al. | |
| 6,122,734 A | 9/2000 | Jeon | |
| 6,170,055 B1 | 1/2001 | Meyer et al. | |
| 6,385,707 B1 | 5/2002 | Maffezzoni | |
| 6,601,139 B1 | 7/2003 | Suzuki | |
| 6,718,463 B1 | 4/2004 | Malik | |
| 7,539,863 B2 * | 5/2009 | Phillips et al. | 713/168 |
| 7,734,933 B1 * | 6/2010 | Marek et al. | 713/193 |
| 7,954,150 B2 * | 5/2011 | Croft et al. | 726/21 |
| 2003/0110371 A1 | 6/2003 | Yang et al. | |
| 2004/0019778 A1 | 1/2004 | Gere | |
| 2005/0097199 A1 | 5/2005 | Woodard et al. | |
| 2005/0193188 A1 * | 9/2005 | Huang | 713/1 |
| 2005/0204013 A1 * | 9/2005 | Raghunath et al. | 709/217 |
| 2006/0004667 A1 * | 1/2006 | Neil | 705/59 |
| 2009/0276509 A1 | 11/2009 | Huang | 709/220 |

* cited by examiner

*Primary Examiner* — Beemnet Dada
*Assistant Examiner* — Randal Moran
(74) *Attorney, Agent, or Firm* — Invent Capture, LLC; Samuel S. Cho

(57) ABSTRACT

The present invention provides methods and apparatuses that utilize a plurality of portable apparatuses to securely operate a plurality of host computers. Each portable apparatus including an operating system and a list of software applications is installed in a removable data storage medium. An authorization procedure is implemented before establishing a connected-state operation between a portable apparatus and a host computer. The host computer loads the operating system in the portable apparatus into its random access semiconductor memory (RAM) through the established connected-state operation.

18 Claims, 9 Drawing Sheets

| | 604 | 606 |
|---|---|---|
| MacAddr OUI: | AA:01:05 | AA:01:05 |
| MacAddr Serial Number: | 10:0A:11 | 00:0A:11 |
| Volume Serial Number: | 18E6-1614 | 3CD8-2FCE |
| CDROM ID String: | CDROM YP326S | CDROM YP325S |
| IDE ID String: | YPOD 1001 HARDDISK | YPOD 1002 HARDDISK |
| Drive Serial Number: | YP10032 | YP10033 |
| BIOS Data: | 88 65 C1 81 | B6 EC 38 3C |

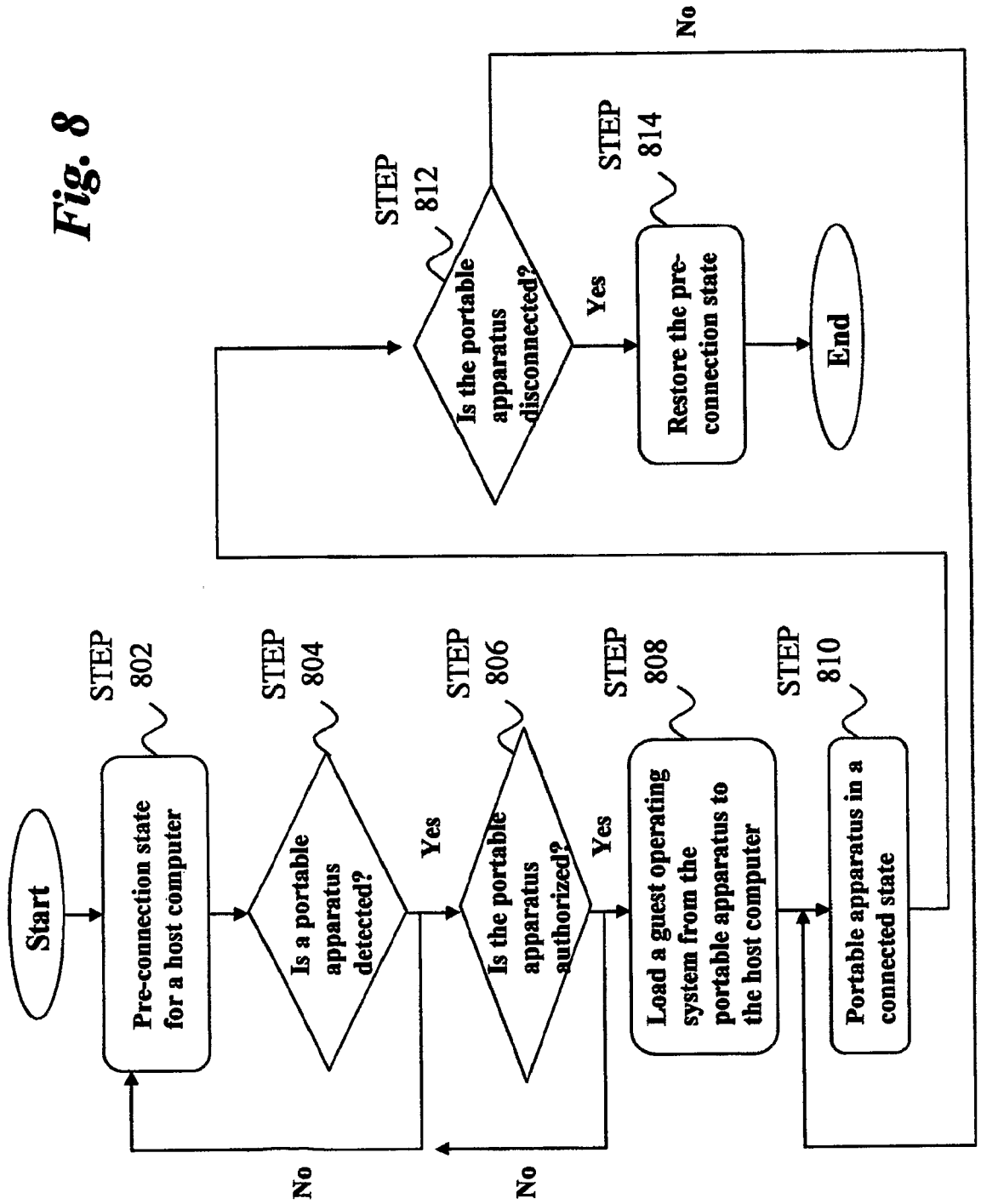

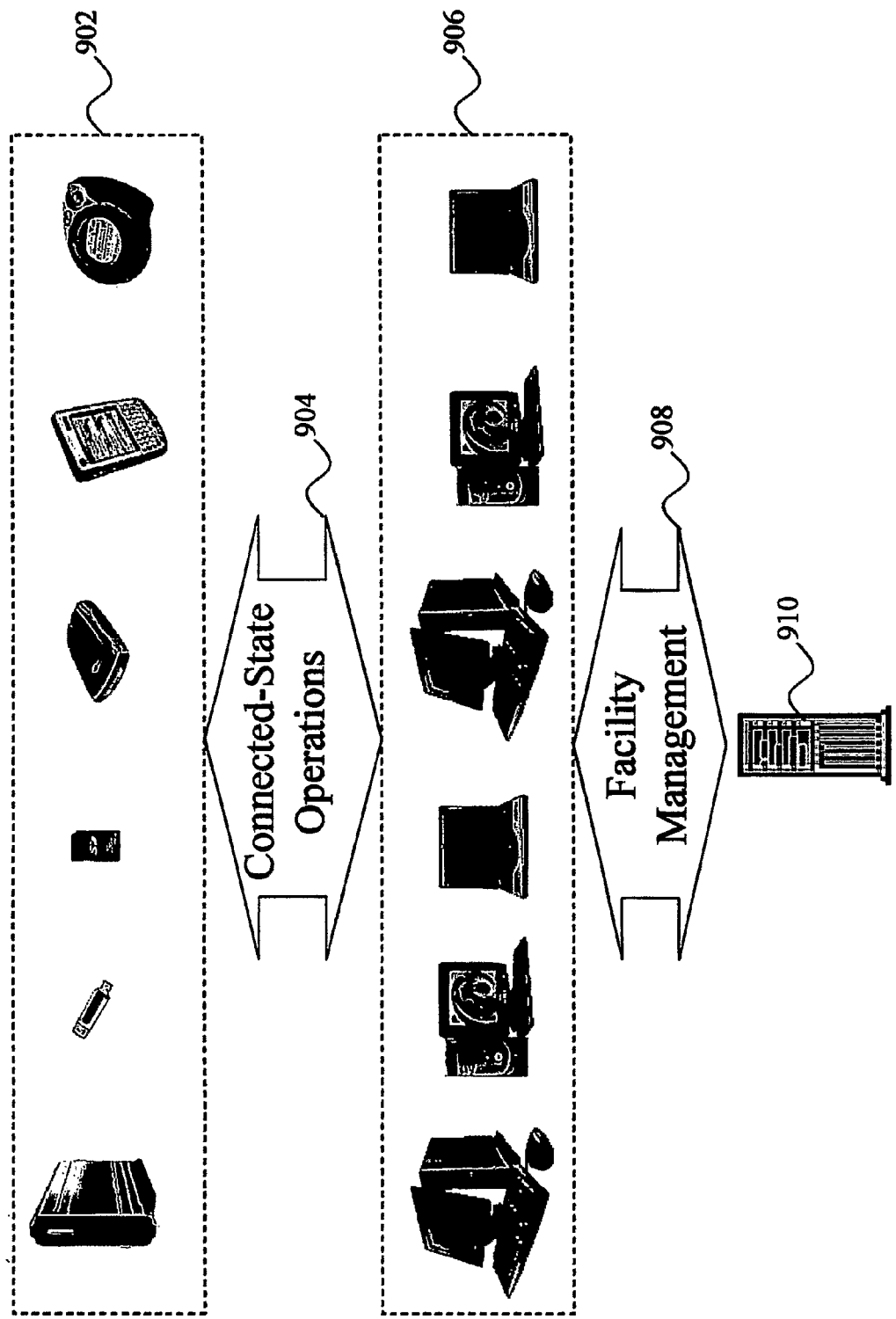

METHODS AND APPARATUSES FOR SECURELY OPERATING SHARED HOST COMPUTERS WITH PORTABLE APPARATUSES

CROSS REFERENCE TO RELATED APPLICATIONS

The present invention claims priority under 35 U.S.C. 119 (e) from provisional patent application Ser. No. 60/788,189, entitled "Methods and Apparatuses for Securely Operating Shared Host Computers with Portable Apparatuses", filed on Mar. 31, 2006, the disclosure of which is herein incorporated by reference in its entirety.

BACKGROUND

1. Field of the Invention

The present invention generally relates to the area of operating computer systems, and more particularly relates to methods or apparatuses for securely operating shared host computers with portable apparatuses.

2. Description of the Related Art

As the computer evolved from mainframe to minicomputer to PC, it progressed from a device for solving specific problems, to a companion device for storing valued personal data. Users now look to the computer for a private, secure, familiar working environment that can include an Internet browser, email software, text editor, presentation software, and spreadsheet application, along with parameter settings for those applications, such as options to choose a home page, browser favorites, incoming and outgoing email accounts, word-processing style sheets, and presentation and spreadsheet templates. More importantly, a familiar working environment may also include personal files generated from these applications, including valuable files such as resumes, emails, spreadsheets, presentations, and address books.

Although many PC users can now afford to have their own private working environment, computers are typically shared with many other users in schools, libraries, businesses, and homes. On the other hand, a single user may own more than one computer. Computer users often encounter a situation to switch between computers in which they require maintaining consistent settings such as email accounts and network connections among several computers.

U.S. Pub. No. 2003/0110371 published by Yang et al. teaches a method to partially maintain a consistent operating environment by utilizing a USB flash memory device to store the user-specific information from a first computer system. The stored information is temporarily loaded from the USB drive into the same application in a second computer system. This method is trying to transport the personalized computer settings among computer systems with an identical or similar software environment. However, this method neither teaches how to transport a set of familiar applications among computer systems nor teaches how to transport a set of personal files associated with the applications among computer systems. As such, a user may have emails, contacts, and other personal files created by different types of applications scattered over different systems.

A possible approach to maintain a consistent operating environment is to store an operating system along with a list of software applications and personal files in a removable data storage medium, which is then used to operate different computers. This approach can be considered as using a portable apparatus to operate one or more host computers. The portability here not only means the physical mobility of the device but also means the adaptation of the system to operate host computers with different hardware configurations. Accordingly, the host computer needs to be able to boot from the portable apparatus. One implementation is to have the portable apparatus burned in a CD-ROM. The ISO 9660 specification, a bootable CD-ROM format, provides new boot capabilities for personal computers. This specification describes how the BIOS boot procedure can be enhanced to support the CD-ROM using INT 13 calling conventions for enabling the CD-ROM to boot as the "A" drive or "C" drive without device drivers. U.S. Pat. No. 6,122,734 issued to Jeon teaches a bootable CD-ROM disk manufacturing system. However, a portable apparatus implemented in CD-ROMs limits the users' abilities to modify or delete the software applications, to install new applications, or to store personal files on the portable apparatus.

U.S. Pat. No. 6,016,402 issued to Thomas et al. teaches a method to integrate a removable media disk drive into an operating system where the removable media disk drive is first recognized as a fixed disk type then recognized as a floppy disk type. U.S. Pat. No. 5,694,600 issued to Khenson et al. teaches an apparatus for booting a computer using a removable medium disk drive. U.S. Pat. No. 6,385,707 issued to Maffezzoni teaches an apparatus for copying files between drives of a computer system including operating system to create a reliable bootable drive. However, the usage of bootable medium drive in these methods or apparatuses is restricted to provide diagnostic support or backup in the event of a system failure, which only requires to access the file system in the internal hard drive of a problematic computer instead of fully operating a computer system and its peripheral devices.

U.S. Pat. No. 6,170,055 issued to Meyer et al. teaches an approach to create a subset of operating system from a computer in a removable high capacity media disk drive for disaster recovery of the computer. The removable high capacity media includes all necessary operating system components to completely load the operating system and the graphical user interface and to provide a user with access to all computer peripherals. Since the removable high capacity disk includes all of the machine-specific files for a computer system, this rescue disk is only suitable for operating the original computer system or computers with similar hardware configurations.

U.S. Pat. No. 6,601,139 issued to Suzuki teaches an information processing apparatus based on the single medium activated platform architecture operated by a removable data storage medium containing all necessary software and content. A second removable data storage medium with different software and content can also operate the same apparatus. However, the removable data storage media are designed to operate the information processing apparatuses with a specific architecture instead of computers with different hardware configurations.

U.S. Pat. No. 6,718,463 issued to Malik teaches an apparatus and method to boot a data processing system from a removable medium. A first boot identifies the file system of a first data processing system and the file system of the removable medium. The necessary drivers, registry information, and applications needed to operate the hardware of the first data processing system are then copied into the removable medium. The removable medium with the copied hardware information is now ready to boot a second data processing system, which has a similar hardware configuration to the first data processing system. U.S. Pub. No. 2004/0019778 published by Gere also teaches a method and system for implementing a transportable operating system boot environment on a computer system by impressed the hardware and software configuration information onto the stored operating system environment. Both approaches create complete hardware controllable environments for specific computers on a portable apparatus, which may restrict the portability of the apparatus to only a few host computers since the required drivers and their parameter settings may cause confusions when the number of host computers increases. Although Malik teaches a way to clear up the copied information, the overhead of copying information in order to establish a bootable environment increases the processing time for booting up a host computer tremendously.

Traditionally, a close network environment like a corporate intranet installs an antivirus program with the newest update to all the computers within its firewall. Popularity of laptop computers introduces a variation to the network environment. U.S. Pub. No. 2005/0097199 published by Woodard et al. teaches a method and apparatus for maintaining the network security with remote scanning on newly detected network devices. Due to the possibility of frequently switching users with different portable apparatuses on the same shared host computer, the detection of network devices may be cumbersome and the required resources for remote scanning may be intensive.

Another security concern is that a portable apparatus with a malicious operating system may possibly cause an infection of the host computer and other computers in the network. U.S. Pat. No. 5,509,120 issued to Merkin et al. teaches a method and apparatus for detecting computer viruses during power on self test. The detection is based on a cyclic redundancy check (CRC) on the master boot record and the boot record of the selected operating system. The CRC values are generated for the pre-installed systems and the protection is to prevent the virus infection on the boot record, which may load in a malicious program instead of the operating system during booting. However, to pre-record CRC values for variety of portable apparatuses may not be practical and a malicious portable apparatus can happen in the operation system level instead of only the boot record level.

There are many licensing and security issues that need to be addressed from the viewpoint of different parties involved in a connected-state operation environment created by portable apparatuses and host computers. Preventing a software piracy of data stored in a portable apparatus is important. A device-dependent protection is needed to prevent duplicating certain information from one portable apparatus to another apparatus. Another important issue is preventing an exposure of valuable personal information to others when the apparatus is lost or stolen. A user-dependent protection is needed to prevent viewing certain information stored in the portable apparatus. A likely possibility of unintentionally leaking personal information in a virtual environment is through a key-logging program residing on a host operating environment. To prevent this type of information exposure, a controllable host operating environment is needed. Another important security issue is preventing viruses in a portable apparatus from infecting other host computers. Therefore, a restoration procedure for the host computer is needed between users. Furthermore, a server-based facility management may be needed in an enterprise network to maintain and supervise shared host computers used by portable apparatuses.

Therefore, addressing methods and apparatuses to share information securely between a portable apparatus and a plurality of host computers regardless of each host's operating environment is highly beneficial to the field of the invention.

SUMMARY

This section as well as the abstract is for the purpose of summarizing some aspects of the present invention and to briefly introduce some features or preferred embodiments. Simplifications or omissions may be made to avoid obscuring the purpose of the section or the abstract. Such simplifications or omissions are not intended to limit the scope of the present invention.

In accordance with one aspect of the invention, a data processing system comprises a host computer containing a microprocessor coupled to a memory block, a portable apparatus containing a data storage unit, a data communication port in the portable apparatus containing the data storage unit, wherein the data communication port accommodates transfer of data between the host computer and the portable apparatus, a host operating system, wherein the host operating system is configured to operate the host computer in a pre-connection state before an authorization is granted for a guest operation environment between the host computer and the portable apparatus, and a guest operating system contained in the portable apparatus, wherein the guest operating system is configured to provide the guest operation environment to the host computer and the portable apparatus after the authorization is granted for the guest operation environment.

In accordance with another aspect of the invention, a method for securely operating a host computer with a portable apparatus comprises initiating a pre-connection state for the host computer, wherein the pre-connection state includes a system-level firmware or BIOS booting for the host computer, checking whether a portable apparatus is either directly or indirectly connected to the host computer, and if the portable apparatus is either directly or indirectly connected to the host computer: checking whether the portable apparatus is authorized to commence a data transfer activity between the portable apparatus and the host computer, and if the portable apparatus is authorized to commence the data transfer activity between the portable apparatus and the host computer: loading a first guest operating system resident in the portable apparatus to the host computer, and conducting first additional data transfer activities between the portable apparatus and the host computer if the first additional data transfer activities are requested or necessary, if the portable apparatus is not authorized to commence the data transfer activity between the portable apparatus and the host computer: requesting an authorization permission to commence the data transfer activity by communicating with a software vendor, a computer user, or an intellectual property compliance entity if necessary, and if the authorization permission to commence the data transfer activity is granted: loading the first guest operating system resident in the portable apparatus to the host computer, and conducting second additional data transfer activities between the portable apparatus and the host computer if the second additional data transfer activities are requested or necessary.

In accordance with another aspect of the invention, a data processing system comprises a host computer containing a microprocessor coupled to a memory block, a portable apparatus containing a data storage unit, a data communication port in the portable apparatus containing the data storage unit, wherein the data communication port accommodates transfer of data between the host computer and the portable apparatus, a system-level firmware or a BIOS, wherein the system-level firmware or the BIOS is configured to operate the host computer in a pre-connection state before an authorization is granted for the guest operation environment between the host computer and the portable apparatus, and a guest operating system contained in the portable apparatus, wherein the guest operating system is configured to provide the guest operation environment to the host computer and the portable apparatus after the authorization is granted for the guest operation environment.

These and other features, aspects and advantages of the present invention will become better understood with reference to the following drawings, description and claims.

BRIEF DESCRIPTION OF DRAWINGS

FIG. 6 shows an example of hardware configuration parameters for a virtual environment including a set of hardware configuration along with a first set of parameters and a second set of parameters in accordance with one or more embodiments of the invention.

FIG. 8 shows a method to share information between a host computer and a portable apparatus in accordance with one or more embodiments of the invention.

FIG. 9 shows a plurality of portable apparatuses connectively operating a plurality of host computers managed by a server computer in accordance with one or more embodiments of the invention.

DETAILED DESCRIPTION

Figure 1:
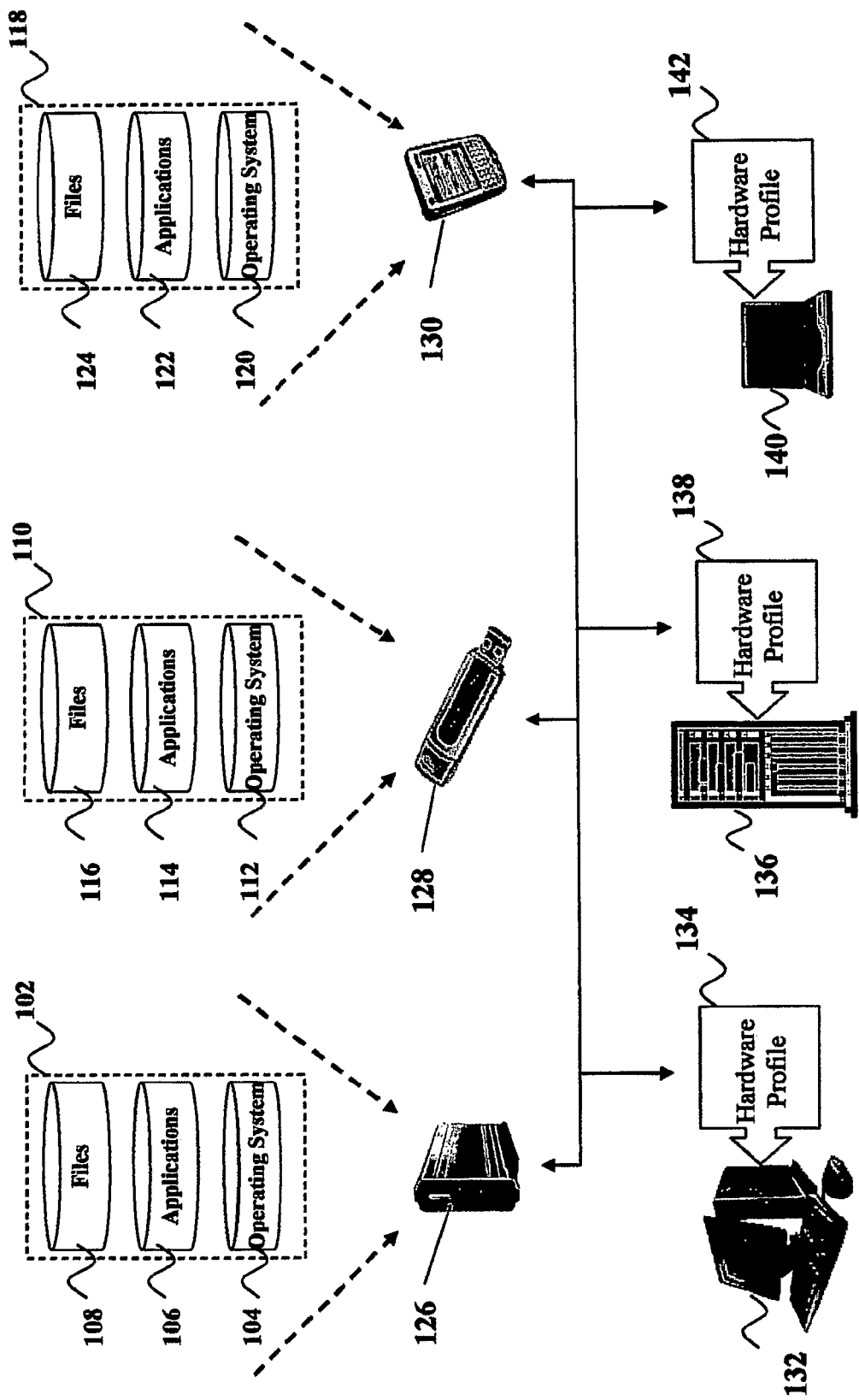
FIG. 1 shows a plurality of portable apparatuses operatively connected to a plurality of host computers in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Referring now to the drawings, in which like numerals refer to like parts throughout the several views, FIG. 1 shows a plurality of portable apparatuses such as a external hard disk (126), a flash memory drive (128), and a PDA device (130) operatively connected to a plurality of host computers (132, 136, 140) in accordance with one or more embodiments of the invention. The term "portable" for each portable apparatus (126, 128, 130) means physical mobility as well as system adaptation. The physical mobility is provided by a removable storage medium.

In a configuration shown in FIG. 1, each host computer contains its own hardware profile information which is used in conjunction with device and/or user-dependent information in each portable apparatus. The portable apparatuses (126, 128, 130) embed non-volatile storage units containing complete operation systems (102, 110, 118) and each of the operation systems (102, 110, 118) includes data files (108, 116, 124), applications (106, 114, 122), and operating systems (104, 112, 120). Each portable apparatus contains at least one operation system (102, 110, 118), defined here as a "guest operation system" which includes at least one operating system (104, 112, or 120), defined here as a "guest operating system", and the guest operating system operates the host computer under the guest operation system environment after an authorization is granted.

For example, the flash memory drive (128) contains a guest operation system (110). When the flash memory drive (128) is either directly or indirectly connected to a laptop computer (140) (i.e. a type of a host computer), the laptop computer (140) and the flash memory drive (128) are initially engaged in an authorization process. The authorization process typically involves information stored in the hardware profile (142) of the laptop computer and/or user and device-related information stored in the flash memory drive (128). If the flash memory drive (128) is authorized to share data with the laptop computer (140), the flash memory drive (128) generates a guest operation system environment to the laptop computer (140) (e.g. a virtual operating system loaded on top of the host's operating system) from the guest operation system portion (112) of its non-volatile storage unit containing the guest operation system (110).

Continuing with FIG. 1., a major objective of each portable apparatus in this configuration is to provide a consistent operation environment to its user regardless of which host computer and host O/S platforms the user encounters by loading a guest operating system stored in each portable apparatus. In some instances, the guest operating system is a virtual operating system environment loaded on top of a host's operating system. In other instances, the guest operating system becomes a main software-level operating system for the host computer which lacks a software-level operating system other than a firmware or BIOS in the host computer.

The major challenge for a portable apparatus is to deal with the system adaptation for host computers with different hardware configurations such as motherboard, CPU, RAM, and BUS. Furthermore, in the configuration as shown in FIG. 1, each host computer (132, 136, 140) support a list of peripheral hardware devices such as monitors, keyboards, printers, scanners, DVD/CD-ROM's, network adapters, and etc. In order to support these devices produced by different manufacturers, many of these devices require installing drivers provided by peripheral device manufacturers. Furthermore, the manufacturers may also provide a utility program to configure their driver. For example, the driver for the wireless PC card may need to specify an access point, encryption length, encryption phrase, and other parameters. Similar examples can also apply to other peripheral devices, such as network or local printer settings and local area network TCP/IP settings. A collection of drivers and other hardware-specific parameters to operate specific hardware devices, including the portable apparatuses (126, 128, 130), is called a hardware profile. In the configuration as shown in FIG. 1, each host computer stores a hardware profile (134, 138, 142) for authorizing a portable apparatus.

A major benefit of using a plurality of portable apparatuses is cost reduction when a large number of portable apparatuses shares a smaller number of host computers. One example is a school computer lab with a certain number of computers being shared by students. Since the cost of a portable apparatus may only be a fraction of the cost of a host computer, there is less financial burden on the school computer lab when each student uses a portable apparatus that contains a guest operating system as well as application specific data and software. The students can also use their portable apparatuses on host computers at home, which once again can be shared by the portable apparatuses of other family members.

A similar case can also be applied to some centralized service facilities such as a call center, where many operators working on different shifts share a same set of computers. The concept of portable apparatuses which are configured to load personalized guest operating systems to host computers introduces tremendous flexibility in terms of organizing such a facility. Other cases for sharing host computers with portable apparatuses with their own sets of guest operating systems can occur in libraries, Internet cafés, business lounges at airports, and other places.

Figure 2:
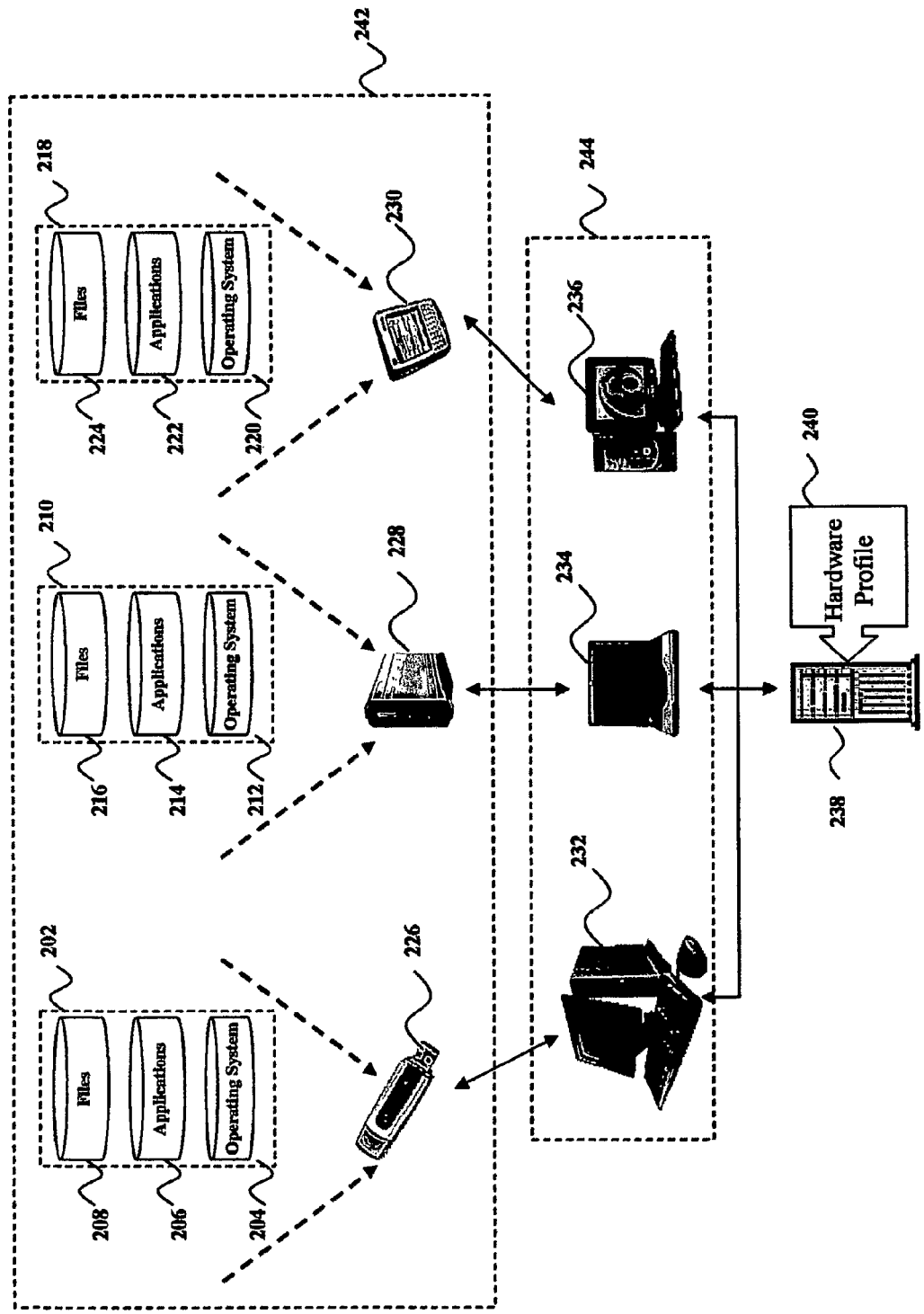
FIG. 2 shows a plurality of portable apparatuses operatively connected to a plurality of host computers with a server centrally managing hardware profiles in accordance with one or more embodiments of the invention.

FIG. 2 shows another configuration of a plurality of portable apparatuses (226, 228, 230) operatively connected to a plurality of host computers (232, 234, 236) in accordance with one or more embodiments of the invention. In the configuration as shown in FIG. 2, a computer server (238) centrally manages a plurality of hardware profiles (240) for the host computers (232, 234, 236) which are operatively connected to the computer server 238. The portable apparatuses (226, 228, 230) contain at least one operating system each (i.e. operating systems 204, 212, 220). These operating systems are "guest" operating systems which are loaded to the host computers (232, 234, 236) when the portable apparatuses (226, 228, 230) are either directly or indirectly connected to the host computers (232, 234, 236) and authorized to share data. In some instances, the guest operating system is a viral operating system environment loaded on top of a host's operating system. In other instances, the guest operating system becomes a main software-level operating system for the host computer which lacks a software-level operating system other than a firmware or BIOS in the host computer.

Each portable apparatus (226, 228, 230) embeds at least one non-volatile storage unit containing a complete operation system (202, 210, 218), which includes data files (208, 216, 224), applications (206, 214, 222), and at least one guest operating system (204, 212, 220). When a portable apparatus is either directly or indirectly connected to a host computer, these data resident in the portable apparatus provides a consistent operation environment for its user regardless of a type of a host operating system resident on a host computer because the portable apparatus loads its own guest operating system in the host computer.

Continuing with FIG. 2, a plurality of host computers (244) is managed by a server computer (238) to monitor the usage of the host computers (232, 234, 236) by portable apparatuses (242) in an enterprise or a school network. In one embodiment, a restoration procedure to verify the hardware profile (240) or the virtual environment is performed on the host computers (232, 234, 236) to prevent virus propagation among the portable apparatuses (242) or the host computers (232, 234, 236). In another embodiment, the host computer (234) is a shared laptop for sales people in an enterprise or for students at a school. To prevent an unintentional exposure of personal information through a contaminated hardware profile or a virus-infected virtual environment, a controllable operation environment by a portable apparatus (228) is needed during the operation. In another embodiment, a host computer (232) is a shared public desktop in a library or an Internet Café. To avoid an unwanted exposure of personal information for a stolen or lost device (226), a user-dependent protection mechanism is used during the operation. In another embodiment, a device-dependent protection mechanism is used to prevent software piracy for the operating system or other application in the portable apparatus.

Figure 3:
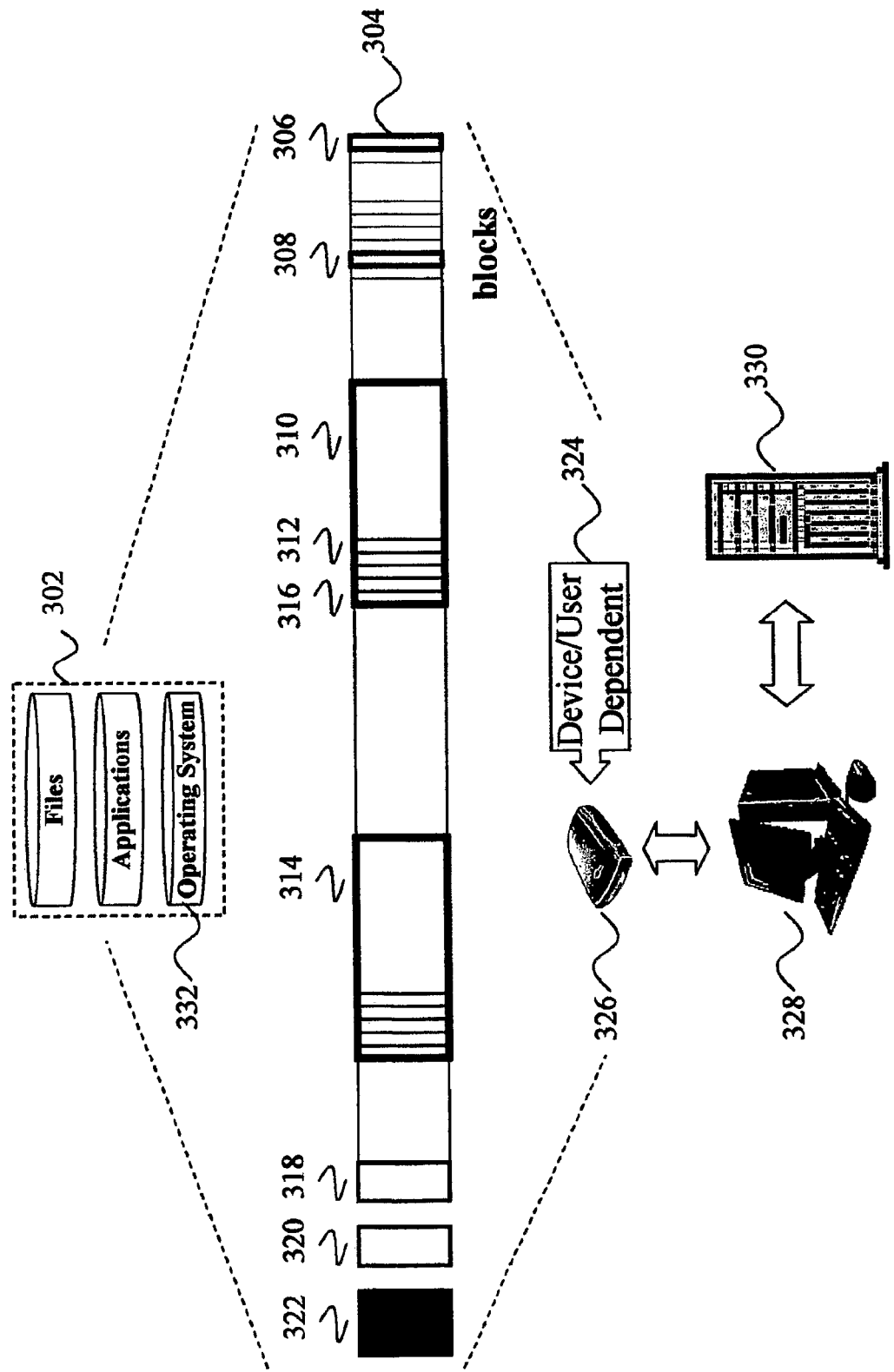
FIG. 3 shows a particular example of files, applications, and a guest operating system resident in a memory space of a portable apparatus operatively connected to a host computer in accordance with one or more embodiments of the invention.

FIG. 3 shows an example of a portable apparatus (326) where at least one operation system (302) with at least one operating system (332) is stored in a logical information storage area (310 or 314) in at least one memory area (304) of the apparatus in accordance with one or more embodiments of the invention. A block (308) in the memory area (304) is a combination of one or more bytes. In one embodiment, a block (308) is a hard disk sector with 512 bytes in the memory area (304). A first sector (306) is the master boot record containing partition table information of the memory area (304). In one embodiment, the logical information storage area (310 or 314) is a logical drive specified by the partition table. In another embodiment, each partition is formatted into a file system and the logical information storage area (310 or 314) can be a file, a directory, or other information-holding structure in the file system. A hidden area (318) of the memory area (304) contains one or more blocks which are outside of blocks specified in the partition table information. A device-dependent information area (320) is separated from the memory area (304). In one embodiment, the device-dependent information is stored in a device firmware or a BIOS.

Figure 4:
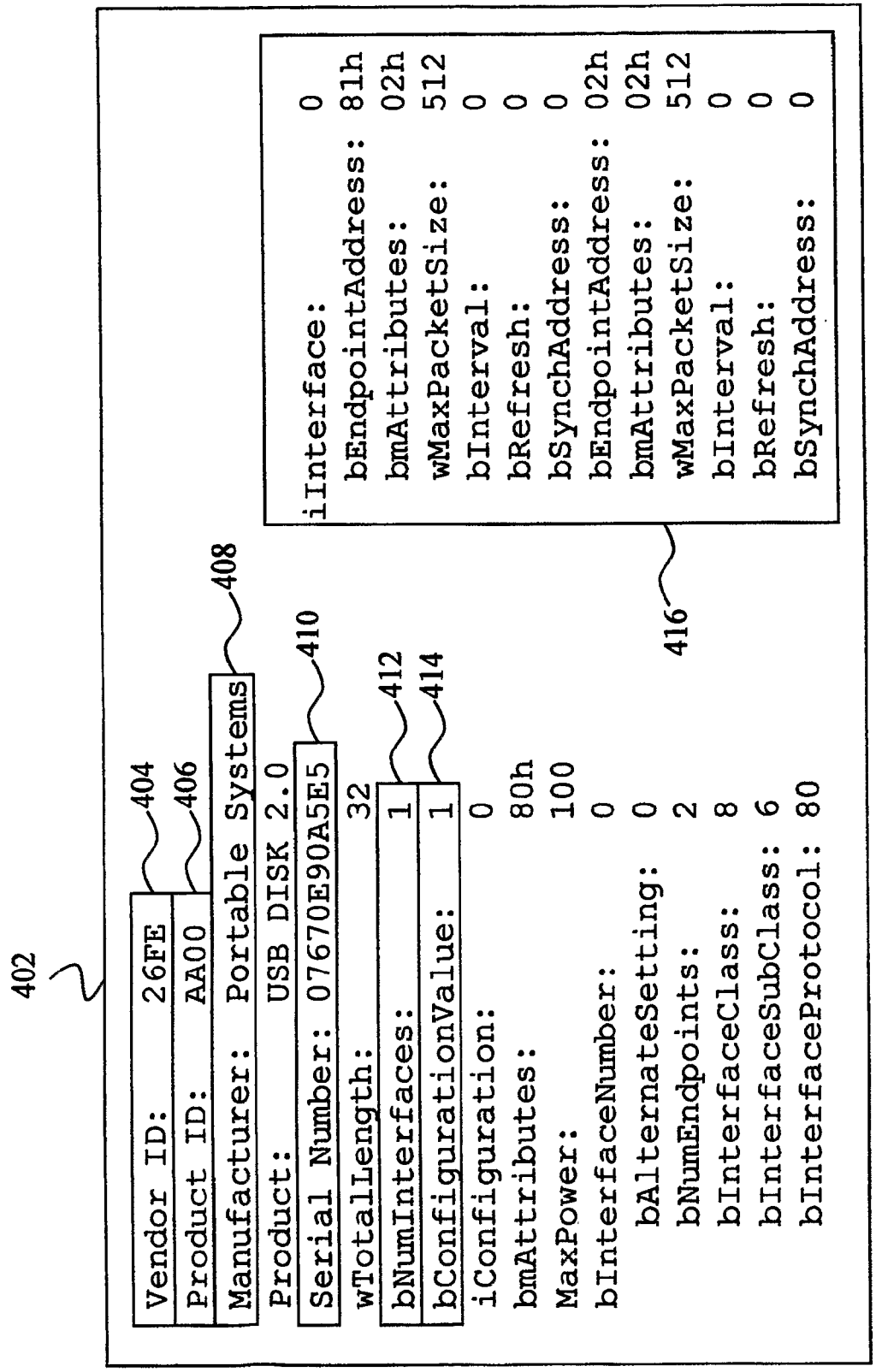
FIG. 4 shows an example of device-dependent firmware information in accordance with one or more embodiments of the invention.

FIG. 4 shows an example of firmware information (402), where a Vendor ID (404), a Product ID (406), a manufacturer name (408), a serial number (410), an interface number (412), a configuration value (414), interface parameters (416), and other information can be used to uniquely identify a particular device. Relating to FIG. 3, this information can further be used to create device-dependent binding data (324) between the operation system (302) and the portable apparatus (326). In one embodiment of the invention, the portable apparatus (326) also includes a microprocessor (322). In another embodiment, a biometric portable apparatus uses the microprocessor (322) to provide the user-dependent binding data (324) between the operation system (302) and its user. After an authentication process, an instance of a connected-state operation environment of the operation system (302) is created by the portable apparatus (326) in the host computer (328). This operation environment can be further monitored and/or maintained by a server computer (330) through a network. In one embodiment of the invention, the server computer (330) contains hardware profile data for a host computer (328) operatively connected to the server computer (330).

Figure 5:
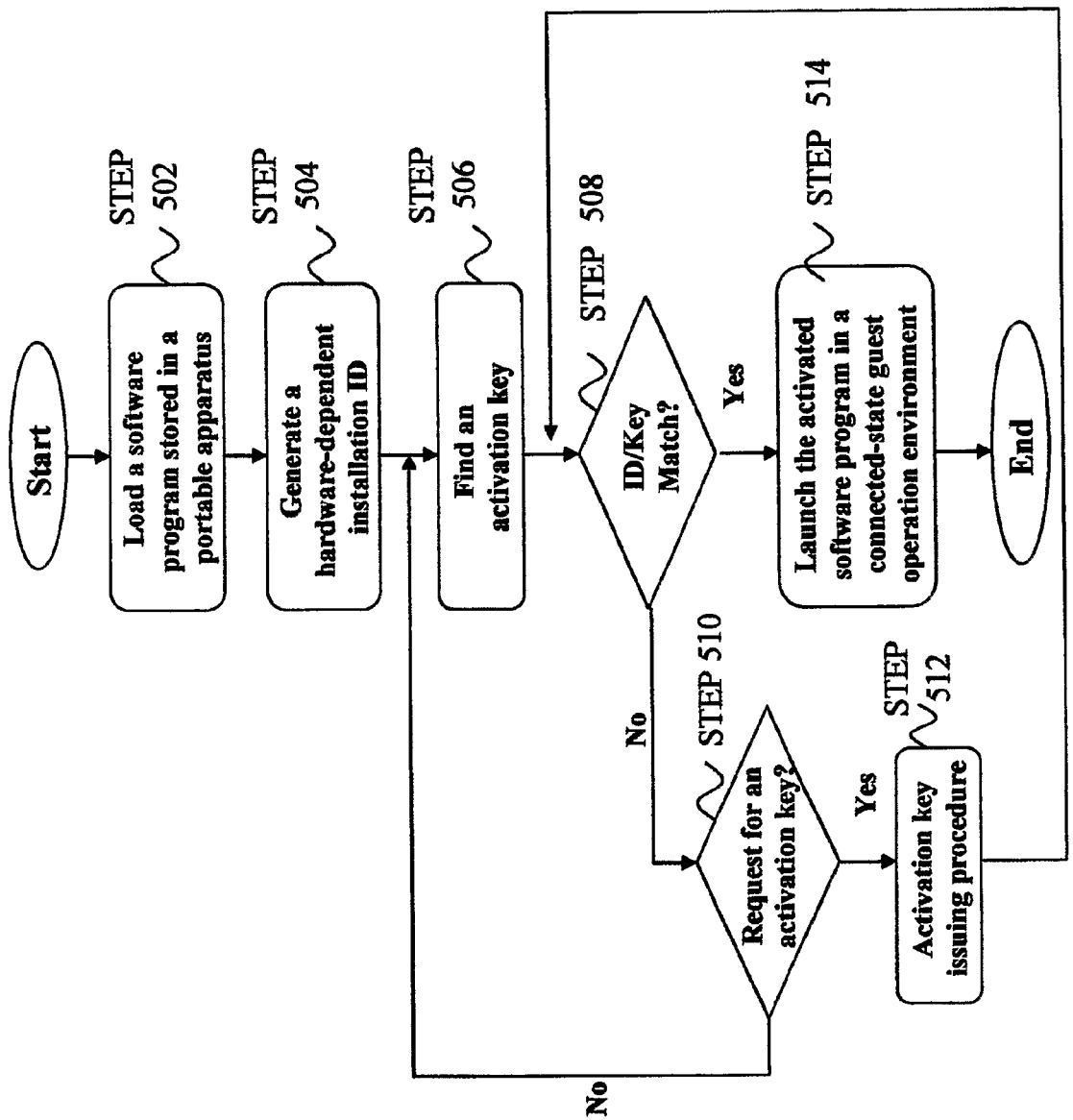
FIG. 5 shows an example of an activation validation procedure by loading a software program from a portable apparatus in accordance with one or more embodiments of the invention.

Relating to FIG. 3, FIG. 5 shows an activation validation procedure for loading a software program in an operation system (302) from a portable apparatus (326) into a connected-state guest operation environment in a host computer (328). This activation validation procedure includes loading a selected software program, generating a hardware-dependent installation ID, checking whether the generated hardware-dependent installation ID matches an activation key, launching the activated software program in the connected-state guest operation environment if there is a match between the hardware-dependent installation ID and the activation key, and requesting an activation key to a user, a software vendor, or an intellectual property compliance entity if there is a mismatch between the hardware-dependent installation ID and the activation key.

In STEP 502, a software program is first loaded from the portable apparatus (326). In STEP 504, the hardware-dependent installation ID is then generated. In STEP 506, the software program searches for an activation key typically stored in the portable apparatus (326), the host computer (328), or the computer server (330). If the activation key is not found or the hardware-dependent installation ID does not match the activation key in STEP 508, then the software program determines whether an activation key issuing procedure (i.e. STEP 512) is requested by the user, the software vendor, or the intellectual property compliance entity (i.e. STEP 510). If the activation key issuing procedure is requested, then an activation key is typically acquired in STEP 512 by going through an activation key issuing process defined by the user, the software vendor, or the intellectual property compliance entity before checking a match of the hardware-dependent installation ID and a newly-issued activation key in STEP 508. If the hardware-dependent installation ID and the activation key matches, the activated software program is launched in a connected-state guest operation environment in the host computer (328), as shown in STEP 514.

One embodiment which incorporates many aspects of the invention displayed by FIG. 2, FIG. 3, and FIG. 5 is a Windows Product Activation for Windows XP from Microsoft. In this example, an activation confirmation, hardware configurations at the activation, and current hardware configurations are all stored in a WPA.dbl file under System32 subdirectory of Windows directory. In one embodiment of the invention, a logical information storage area (310) of a memory area (304) in a portable apparatus (326) is a logical drive containing an installed Windows XP operating system that will be used to boot a host computer (328) and create a connected-state operation environment.

In this particular situation, required hardware configurations for the previously confined activation is provided by the host computer (328) and the license is issued to the host computer (328) instead of the portable apparatus (326). The license file, WPA.dbl, are incorporated from a hardware profile to create an activated connected-state operation environment, which is compliant with the activation validation procedure in FIG. 5 without re-activation. In a configuration as shown in FIG. 2. in accordance with one or more embodiments of the invention, a server computer (238) can further be used to manage and maintain the activation procedures for a plurality of portable apparatuses (242) and a plurality of host computers (244).

Continuing with the Windows XP example, in one embodiment of the invention, the logical information storage area (310) of the memory area (304) in the portable apparatus (326) is a partition or an image file containing an installed Windows XP operating system that will be used to boot into a virtual environment in the host computer and create a connected-state operation environment. A virtual environment can provide a consistent simulated hardware configuration within the host operating environment regardless the hardware configuration of the host computer (328). To avoid illegally duplicating one activated operation system (302) on different portable apparatuses, a set of parameters of the hardware configuration to create a unique connected-state operation environment can be stored outside of the logical information storage area (310), which is used to store the operation system (302).

FIG. 6 shows an example of hardware configuration parameters for the virtual environment including a set of hardware configuration (602) along with a first set of parameters (604) and a second set of parameters (606). Relating to FIG. 3, an activated operation system (302) in a portable apparatus (326) is associated with a set of parameters (i.e. 604 or 606). In one embodiment, this set of parameters is stored in a device-dependent information area (320) separated from a memory area (304). In another embodiment, this set of parameters is encrypted by the device-dependent information (402) as shown in FIG. 4 and is stored in the hidden area (318) of the memory area (304). In an additional embodiment, a second logical information storage area (314) contains a software program to create a virtual environment in a host computer (328) for the operation system (302) stored in the first logical information storage area (310). This program can create a unique viral environment by loading the set of parameters from the device-dependent information area (320), by decrypting the encrypted parameters in the hidden area (318), or by decrypting a block (316) within the software program in the second logical information storage area (314) that contains the parameters encrypted by the device-dependent information (402).

The aforementioned embodiments for the Windows XP example can be applied to any software program including operation systems and applications stored in the portable apparatus. The activation procedures of those programs can be device-dependent to the portable apparatus (326) and/or the host computer (328). An activated connected-state operation environment means that the connected-state operation between the portable apparatus (326) and the host computer (328) will incorporate the required activation information for at least one previously activated software program in the operation system (302) stored in the logical information storage area (310).

To avoid the exposure of personal information for a stolen/lost portable apparatus (326), a user-dependent protection mechanism is needed for creating the connected-state operation environment from the operation system (302) stored in the logical information storage area (310). In one embodiment, a user-dependent encryption key generated from user's password, fingerprint, voice, or other inputs is used to decrypt all the blocks in the logical information storage area (310). In another embodiment, only selected blocks (312, 316) are encrypted. In one instance of this embodiment, the encrypted block is determined by a signature within the block. In another instance of this embodiment, the encrypted block is determined by a block encryption mapping table. In one embodiment in accordance with the invention, the selected blocks (312, 316) underneath the logical information storage area (310) are encrypted to create private files or folders in the connected-state operation environment. In another embodiment in accordance with the invention, the selected blocks (312, 316) in the logical information storage area (310) implements a user-dependent encrypted pseudo disk image for the operation system (302). The encrypted pseudo disk image can be decrypted by the driver for the simulated hard drive in a virtual environment.

Figure 7:
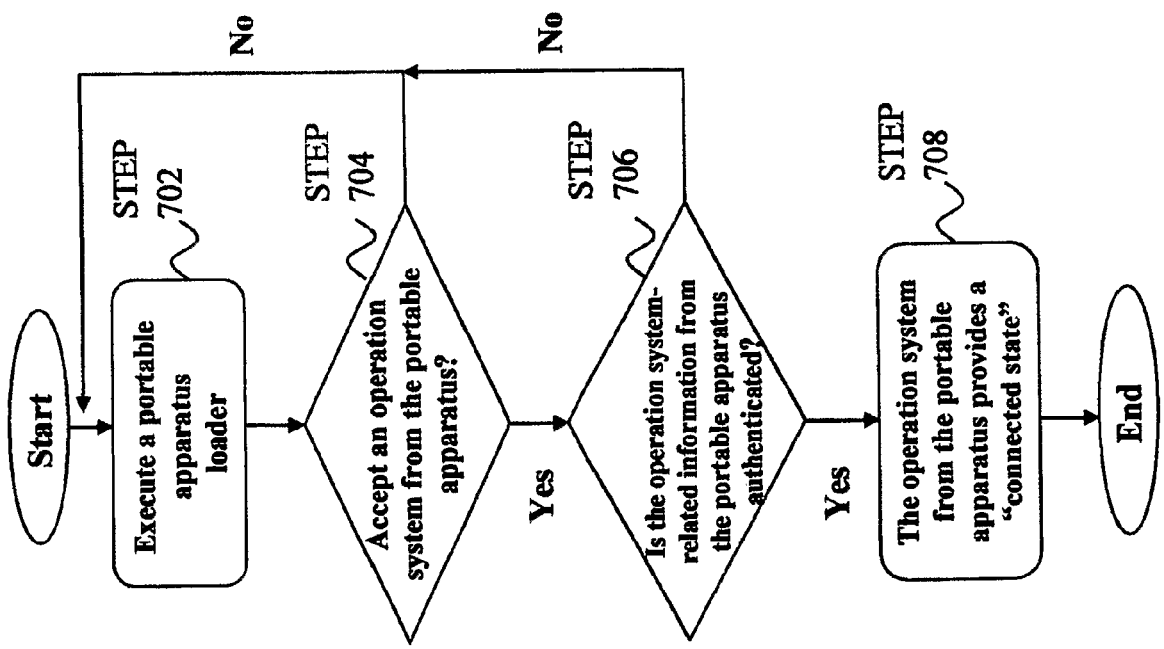
FIG. 7 shows an example of loading a guest operating system from a portable apparatus to a host computer to establish an authenticated connected-state operation environment in accordance with one or more embodiments of the invention.

Relating to FIG. 3, FIG. 7 shows a procedure for establishing an authenticated connected-state operation between a portable apparatus (326) and a host computer (328) in accordance with one embodiment of the invention. In STEP 702, the host computer (328) executes a portable apparatus loader program residing in the portable apparatus (326) or the host computer (328). Pre-defined information stored in the host computer (328) or through a network server computer (330) decides whether to accept the operation system (302) from the portable apparatus (326) in STEP 704. In one embodiment, the pre-defined information is a specific set of vendor identifiers and device types of the portable apparatuses or certain device IDs stored in a hidden area (318). This embodiment can restrict portable apparatuses to work with host computers within a controllable environment like an office intranet. In another embodiment, the pre-defined information is a serial number of a specific portable apparatus which is used by an owner of the portable apparatus (326) to reserve a public host computer (328) through the server computer (330) for a particular time slot. In an additional embodiment, STEP 704 is skipped if there is no pre-defined information in the home host computer (328).

STEP 706 is an authentication procedure which is performed in the portable apparatus (326) and/or the host computer (328) to verify the information loaded from the portable apparatus (326). In one embodiment, a user provides a user-dependent encryption key to decrypt at least one block of the logical information storage area (310) storing the operation system (302). In one instance of this embodiment, a decryption procedure uses an embedded processor (322) in the portable apparatus (326) and a decrypted block is sent to the host computer (328). In another instance of this embodiment, the decryption procedure is implemented by a program in the host computer (328).

Continuing with FIG. 7 related to FIG. 3, in another embodiment for STEP 706, a device-dependent encryption key from the hidden area (318) or from the information area (320) is used to decrypt at least one block of the logical information storage area (310) storing the operation system (302). In an additional embodiment, a device-dependent encryption key from the hidden area (318) or from the information area (320) is used to decrypt the required activation information for at least one software program in the operation system (302). In another embodiment, a combination of a user-dependent encryption key and a device-dependent encryption key is used to decrypt information for the operation system (302) in the portable apparatus (326). If the decrypted information can be successfully loaded into the host computer (328), an authenticated connected-state operation environment is established between the operation system (302) in the portable apparatus (326) and the host computer (328) in STEP 708.

FIG. 8 shows a method to share information between a host computer and a portable apparatus in accordance with one or more embodiments of the invention. These embodiments are preferred embodiments of the invention. In STEP 802, the host computer operates in a pre-connection state which is before a portable apparatus is either directly or indirectly connected to the host computer. In some instances, the host computer uses a software-level host operating system such as Windows XP, Linux, or Mac OS. In other instances, the host computer only uses a firmware or a BIOS and entirely depends its software-level operating system on a guest operating system provided by a portable apparatus after the portable apparatus enters a connected state.

In STEP 804, the host computer attempts to detect a portable apparatus which may have been either directly or indirectly connected to the host computer recently. In one embodiment of the invention, this detection is implemented by a regular polling to a peripheral connector (i.e. for detecting a direct connection) and a network (i.e. for detecting an indirect or networked connection). If the portable apparatus is detected, the host computer and the portable apparatus engage in an authorization process in STEP 806. In one embodiment of the invention, the authorization process follows authentication steps described previously for FIG. 7. In STEP 808, if the portable apparatus is authorized, the host computer loads a guest operating system from the host computer, either by placing it on top of a host operating system for a virtual operating environment or using the guest operating system as the host computer's only software-level operating environment. Once the guest operating system is loaded to the host computer, the portable apparatus and the host computer are in a connected state, as shown in STEP 810.

Continuing with FIG. 8, if the portable apparatus is determined to be disconnected from the host computer after a regular polling in STEP 812, a restoration procedure is necessary to restore the host computer to its pre-connection state, as shown in STEP 814.

In one embodiment of the restoration procedure in accordance with the invention, the pre-connection state (i.e. STEP 802) represents a safe sharing environment for the portable apparatus that is provided by a server computer connected to a host computer. When the portable apparatus is disconnected, as shown in STEP 812, the hardware profile is restored by the server computer to prevent a contaminated hardware profile from propagating viruses to other users, portable apparatuses, and host computers. In another embodiment, the pre-connection state (i.e. STEP 802) is an operation environment generated by a fixed operating image that the connected-state operation environment is running within a virtual environment in the pre-connection state. After the connected-state operation is disconnected, the host computer is rebooted back to its initial state using this fixed image. This image can be stored in an internal hard drive of the host computer or a network drive managed by the server computer.

Using FIG. 3 as an example to describe another embodiment of the information sharing between a host computer and a portable apparatus of FIG. 8, the information storage area (310) is a bootable partition to store an operating image for the pre-connection state of an operation system (302) stored in another logical information storage area (314). When the portable apparatus (326) connects to the host computer (328), a first connected-state operation environment is created in the host computer (328) by the operating image in (310). A virtual environment is then created within the first connected-state operation environment for a second connected-state operation environment with the operation system (302) stored in a logical information storage area (314).

FIG. 9 shows a plurality of portable apparatuses (902), a plurality of host computers (906), and a server computer (910) where the connected-state operations (904) between the plurality of portable apparatuses (902) and the plurality of host computers (906) are managed by a server computer (910) in accordance with the invention. In one embodiment, the server computer (910) supervises pre-connection states of the plurality of host computers 906 via a facility management (908). The server computer (910) can force a particular host computer to restore its pre-connection state. In another embodiment, a reservation procedure is provided by the server computer (910) to allow a particular portable apparatus to reserve a particular host computer for a particular time slot. During the particular time slot, the reserved host computer only allows the portable apparatus to establish an authenticated connected-state operation environment. In an additional embodiment, a portable apparatus loader program is controlled by the server computer (910) that only allows certain types of portable apparatuses to establish an authenticated connected-state operation environment on certain host computers. In another embodiment, a log file is created in the server computer (910), which records the usage of the plurality of host computers (906) and the plurality of portable apparatuses (902).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A data processing system comprising:
    a host computer containing a microprocessor coupled to a memory block;
    a portable apparatus containing a data storage unit;
    a computer system server connected to the host computer, wherein the computer system server manages the authorization of the guest operation environment between the portable apparatus and the host computer with the hardware profile stored and maintained in the computer system server by the host computer;
    a data communication port in the portable apparatus containing the data storage unit, wherein the data communication port accommodates transfer of data between the host computer and the portable apparatus;
    a host operating system originating from the host computer or a peripheral device native to the host computer, wherein the host operating system is configured to operate the host computer in a pre-connection state in which a hardware profile stored and maintained by the host computer decides to grant or deny an authorization request for creating a guest operation environment from a guest operating system contained in the portable apparatus; and
    the guest operating system contained in the portable apparatus, wherein the guest operating system is configured to provide the guest operation environment to the host computer and the portable apparatus if the authorization request is granted by the hardware profile stored and maintained by the host computer.

2. The data processing system of claim 1, wherein the authorization request granted for the guest operation environment is established by comparing a device identification of the portable apparatus, a user-given password, or decrypted device information with the hardware profile information stored and maintained by the host computer, wherein the hardware profile information is stored in a native storage of the host computer or a network storage operatively connected to the host computer, but not in the portable apparatus.

3. The data processing system of claim 1, wherein the guest operation environment provided by the guest operating system contained in the portable apparatus is a virtual operating environment running on top of the host operating system.

4. The data processing system of claim 1, wherein the guest operation environment provided by the guest operating system contained in the portable apparatus accommodates authorized uses of intellectual property or copyrighted data in the data storage unit of the portable apparatus.

5. The data processing system of claim 1, further comprising a cluster of computers connected to the computer system server, wherein the computer system server manages a plurality of authorizations for data transfer activities between a plurality of portable apparatuses and the cluster of computers.

6. The data processing system of claim 1, wherein the guest operation environment between the host computer and the portable apparatus is wirelessly implemented or via the Internet.

7. The data processing system of claim 1, wherein the host operating system is contained in the host computer.

8. The data processing system of claim 1, wherein the host operating system is restored from the guest operation environment to the pre-connection state in the host computer if the portable apparatus is either directly or indirectly disconnected from the host computer.

9. A method for securely operating a host computer with a portable apparatus, the method comprising:
    initiating a pre-connection state for the host computer, wherein the pre-connection state includes a system-level firmware or BIOS booting for the host computer and also includes accessing a hardware profile stored and maintained by the host computer;
    checking whether a portable apparatus is either directly or indirectly connected to the host computer; and
    when the portable apparatus is either directly or indirectly connected to the host computer:
        checking whether the portable apparatus is authorized to commence a data transfer activity between the portable apparatus and the host computer by analyzing information from the portable apparatus against authorization information of the hardware profile stored and maintained by the host computer; and
        if the portable apparatus is authorized to commence the data transfer activity between the portable apparatus and the host computer:
            loading a first guest operating system resident in the portable apparatus to the host computer; and
            conducting first additional data transfer activities between the portable apparatus and the host computer if the first additional data transfer activities are requested or necessary;
        if the portable apparatus is not authorized to commence the data transfer activity between the portable apparatus and the host computer:
            requesting an authorization permission to commence the data transfer activity by communicating with a software vendor, a computer user, or an intellectual property compliance entity if necessary; and
            if the authorization permission to commence the data transfer activity is granted:
                loading the first guest operating system resident in the portable apparatus to the host computer; and
                conducting second additional data transfer activities between the portable apparatus and the host computer if the second additional data transfer activities are requested or necessary.

10. The method of claim 9, wherein the conditional step of conducting first additional data transfer activities between the portable apparatus and the host computer if the first additional data transfer activities are requested or necessary means loading a second guest operating system into the first guest operating system.

11. The method of claim 9, wherein the conditional step of conducting second additional data transfer activities between the portable apparatus and the host computer if the second additional data transfer activities are requested or necessary means loading a third guest operating system into the first guest operating system.

12. The method of claim 9, wherein the first guest operating system resident in the portable apparatus provides a virtual environment to the host computer if the first guest operating system is loaded to the host computer.

13. The method of claim 9, wherein the step of initiating the pre-connection state for the host computer includes loading a host operating system to the host computer.

14. The method of claim 13, further comprising steps of:
checking whether the portable apparatus is either directly or indirectly disconnected from the host computer; and
restoring the host operating system to the host computer if the portable apparatus is either directly or indirectly disconnected from the host computer and if the host computer was previously operating with the first guest operating system.

15. A data processing system comprising:
a host computer containing a microprocessor coupled to a memory block;
a portable apparatus containing a data storage unit;
a computer system server connected to the host computer, wherein the computer system server manages the authorization of the guest operation environment between the portable apparatus and the host computer with the hardware profile stored and maintained in the computer system server by the host computer;
a data communication port in the portable apparatus containing the data storage unit, wherein the data communication port accommodates transfer of data between the host computer and the portable apparatus;
a system-level firmware or a BIOS originating from the host computer or a peripheral device native to the host computer, wherein the system-level firmware or the BIOS is configured to operate the host computer in a pre-connection state in which a hardware profile stored and maintained by the host computer decides to grant or deny an authorization request for creating the guest operation environment from a guest operating system contained in between the host computer and the portable apparatus; and
the guest operating system contained in the portable apparatus, wherein the guest operating system is configured to provide the guest operation environment to the host computer and the portable apparatus if the authorization request is granted by the hardware profile stored and maintained by the host computer.

16. The data processing system of claim 15, wherein the authorization request granted for the guest operation environment is established by comparing a device identification of the portable apparatus, a user-given password, or decrypted device information with the hardware profile information stored and maintained by the host computer, wherein the hardware profile information is stored in a native storage of the host computer or a network storage operatively connected to the host computer, but not in the portable apparatus.

17. The data processing system of claim 15, wherein the guest operation environment provided by the guest operating system contained in the portable apparatus accommodates authorized uses of intellectual property or copyrighted data in the data storage unit of the portable apparatus.

18. The data processing system of claim 15, further comprising a cluster of computers connected to the computer system server, wherein the computer system server manages a plurality of authorizations for data transfer activities between a plurality of portable apparatuses and the cluster of computers.

* * * * *